Dec. 3, 1957 G. H. HOWARD 2,815,047
VACUUM BOTTLE RACK
Filed Aug. 18, 1955

INVENTOR.
GEORGE H. HOWARD,
BY
ATTORNEY.

United States Patent Office 2,815,047
Patented Dec. 3, 1957

2,815,047

VACUUM BOTTLE RACK

George H. Howard, Long Beach, Calif.

Application August 18, 1955, Serial No. 529,169

5 Claims. (Cl. 141—275)

This invention relates to a vacuum bottle rack whereby a vacuum bottle may be suspended within an automobile, truck, and so forth, or may be hung in other convenient places.

An object of my invention is to provide a novel vacuum bottle rack which will effectively hold a vacuum bottle in an inverted position so that a cup can be conveniently placed below the vacuum bottle, and the contents of the bottle may be drained into the cup as desirable.

Another object of my invention is to provide a novel vacuum bottle rack which is so constructed that it will effectively grip an inverted vacuum bottle, and also will permit the vacuum bottle to be removed from the rack, as necessary, and with a means on the rack supporting a cup below the inverted vacuum bottle so that the cup can be moved either upwardly to engage the vacuum bottle, or downwardly to permit draining of the contents of the bottle into the cup.

Still another object of my invention is to provide a novel vacuum bottle rack which is inexpensive in construction and which will easily and effectively hold the vacuum bottle in an inverted operative position.

Other objects, advantages and features of invention may appear from the accompanying drawing, the subjoined detailed description and the appended claims.

Figure 1:
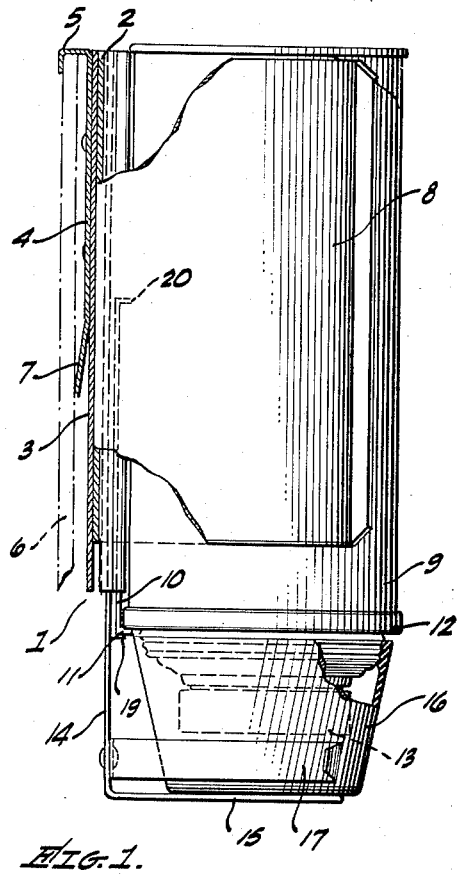
Figure 1 is a side elevation of my vacuum bottle rack with parts broken away to show interior construction.

Referring more particularly to the drawing, my vacuum bottle rack 1 consists of a channel 2 which is positioned vertically, and the purpose of which will be further described. To support the rack I provide a plate 3 which is fixedly attached to the rear face of the channel 2 by suitable means, such as rivets, bolts, welding, or the like. A supporting strip 4 is fixedly attached to the rear face of the plate 3 and is formed with a hook 5 at the upper end which extends over a suitable object in the vehicle, such as the window pane 6 or the molding of the vehicle, and so forth. The lower end of the support 4 is bent outwardly at an angle, as shown at 7, and this bent portion engages the glass or the molding so as to hold the channel 2 in a vertical position. A pair of spring clips 8—8 are secured to the plate 3 or to each side of the channel 2, as may be most convenient. These spring clips partially encircle and tightly grip the inverted vacuum bottle 9, thus securely holding the inverted vacuum bottle in the rack. A finger 10 on the lower end of the channel 2 is formed with a projecting lip 11, and this lip extends under a shoulder 12 on the inverted vacuum bottle 9 for the purpose of supporting the vacuum bottle and preventing the same from moving downwardly, due to vibration or due to insufficient grip of the clips 8—8. A suitable valve 13 is provided on the discharge end or mouth of the inverted vacuum bottle 9 and this valve can be manually opened or closed to drain the contents of the vacuum bottle.

Figure 2:
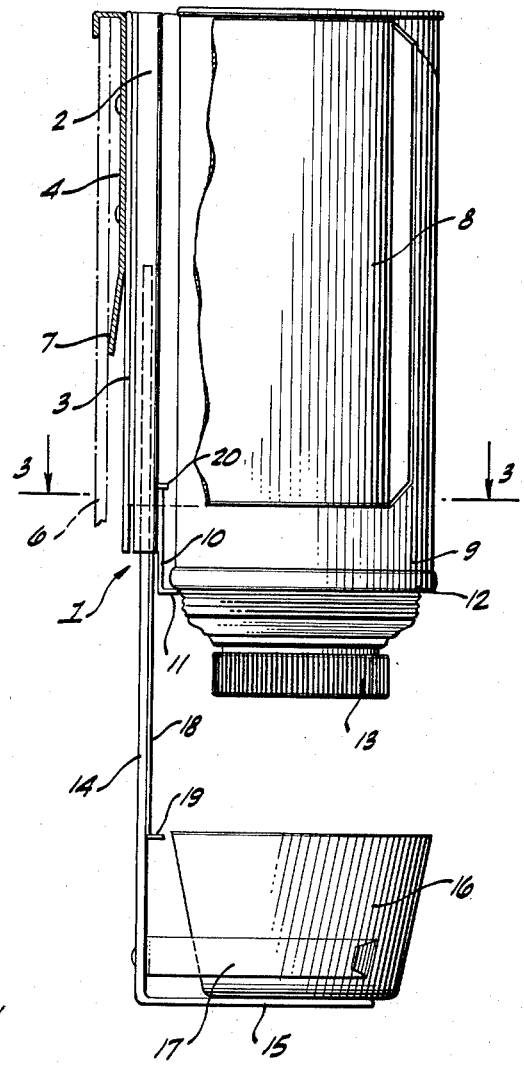
Figure 2 is a side elevation of my vacuum bottle rack and showing the cup in lowered position.
Figure 3:
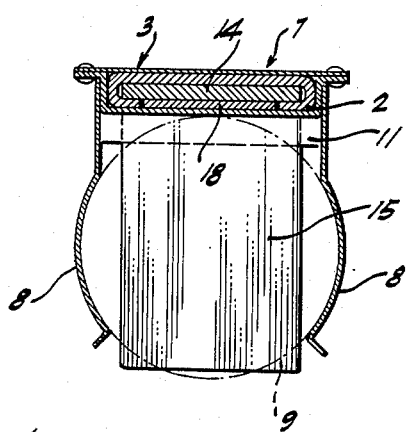
Figure 3 is a transverse sectional view taken on line 3—3 of Figure 2.

The cup support 14 is substantially L-shaped and the lower lip 15 thereof supports the cup 16, which may be the usual cup, which is threaded onto the vacuum bottle 9. The vertical portion of the support 14 extends into and is slidable within the channel 2. Thus the support 14 can be moved upwardly or downwardly in the channel 2 to move the cup from the position shown in Figure 1, in which it engages the discharge end of the inverted vacuum bottle 9 or can be pulled downwardly, as shown in Figure 2, for the purpose of dispensing liquid into the cup 16. Spring fingers 17 on the support 14 engage the cup 16 and hold this cup against accidental displacement. A strip 18, attached to the support 14, serves as a stop or a means to limit the movement of the support. The lower end of the strip is formed with an outwardly bent lip or shoulder 19 which limits the upward movement of the support 14 by engaging the lip 11, and the upper end of the strip 18 is provided with a shoulder 20 which engages the upper end of the finger 10 to limit the downward movement of the support 14.

In operation the inverted vacuum bottle rack is mounted within the vehicle, or elsewhere, by placing the hook 5 over a convenient projection or edge, such as a window pane, or the like. The cup 16 is normally threaded onto the discharge end of the vacuum bottle 9, and when this vacuum bottle is clipped into the spring clips 8 the bottom ledge 15 of the support 14 will engage the cup and hold it against the inverted vacuum bottle 9. The inverted vacuum bottle engages the lip 11, thus holding this bottle against vertical movement. When it is desired to draw a liquid from the inverted vacuum bottle the support 14 is pulled downwardly until the lip 20 engages the top of the finger 10. In this position the valve 13 is readily accessible and can be opened for the purpose of draining liquid from the inverted vacuum bottle 9 and into the cup 16. After the cup 16 is replaced within the finger 17 the support 14 is again pushed upwardly until the cup 16 engages the threaded portion of the vacuum bottle 9, or to permit threading of the cup onto the vacuum bottle, as shown in Figure 1.

Having described my invention, I claim:

1. A vacuum bottle rack comprising a channel, a hook on the upper end of the channel whereby the channel may be suspended, vacuum bottle gripping means mounted on the channel, a cup support slidably mounted in the channel, said cup support being substantially L-shaped and including a lower horizontal lip on which a cup may rest.

2. A vacuum bottle rack comprising a channel, a hook on the upper end of the channel whereby the channel may be suspended, vacuum bottle gripping means mounted on the channel, a cup support slidably mounted in the channel, said cup support being substantially L-shaped and including a lower horizontal lip on which a cup may rest, abutment means located on said channel, and stop means on said cup support being engageable with said abutment means thus limiting the downward movement of said cup support relative to the channel.

3. A vacuum bottle rack comprising a channel, a hook on the upper end of the channel whereby the channel may be suspended, vacuum bottle gripping means mounted on the channel, a cup support slidably mounted in the channel, said cup support being substantially L-shaped and including a lower horizontal lip on which a cup may rest, spring fingers on the cup support adapted to releasably grip a cup.

4. A vacuum bottle rack comprising a channel, a hook on the upper end of the channel whereby the channel may be suspended, vacuum bottle gripping means mounted on the channel, a cup support slidably mounted in the channel, said cup support being substantially L-shaped and including a lower horizontal lip on which a cup may rest, spring fingers on the cup support adapted to releasably grip a cup, abutment means located on said channel, and stop means on said cup support being engageable with said abutment means thus limiting the downward movement of said cup support relative to the channel.

5. A vacuum bottle rack comprising a channel, said channel being vertically arranged, a hook on the upper end of the channel whereby the channel may be suspended, a pair of spring clips arranged on each side of the channel, said spring clips being adapted to engage and grip an inverted vacuum bottle, a cup support, said cup support being substantially L-shaped and including a vertical portion slidably mounted in the channel, and a lower horizontal lip on which a cup may rest, stop means on the vertical portion of the cup support, abutment means located on said channel, said stop means being engageable with said abutment means on the channel to limit downward movement of said cup support relative to the channel, said cup support being movable to press the cup against the discharge end of the vacuum bottle in one position and to space the cup from said discharge end of the vacuum bottle in another position thereof.

References Cited in the file of this patent

UNITED STATES PATENTS

| 451,097 | Wilkinson | Apr. 28, 1891 |
| 1,624,830 | Emsley | Apr. 12, 1927 |
| 1,867,926 | Ruth | July 19, 1932 |
| 1,966,648 | Ryberg | July 17, 1934 |